United States Patent [19]

Uenishi et al.

[11] 4,373,963
[45] Feb. 15, 1983

[54] LUSTROUS PIGMENT AND PROCESS FOR PRODUCING SAME

[75] Inventors: Toshiaki Uenishi; Hidefumi Harada; Katumasa Sasaki; Akio Akagi; Takanori Yamasaki, all of Ube, Japan

[73] Assignee: Titan Kogyo K.K., Japan

[21] Appl. No.: 299,244

[22] Filed: Sep. 3, 1981

[51] Int. Cl.$^3$ .......................... C09C 1/24; C08K 7/00; C01F 7/02
[52] U.S. Cl. .................... 106/304; 106/291; 106/308 B; 423/600
[58] Field of Search ............... 106/304, 291, 308 B; 423/600

[56] References Cited

U.S. PATENT DOCUMENTS

| 2,413,184 | 12/1946 | Lande, Jr. | 423/600 |
| 3,565,656 | 2/1971 | Allen et al. | 106/304 |
| 3,803,074 | 4/1974 | Jenkins | 423/600 |
| 4,234,348 | 11/1980 | Brunn et al. | 106/304 |

FOREIGN PATENT DOCUMENTS

| 2255464 | 5/1973 | Fed. Rep. of Germany | 106/304 |
| 2625401 | 12/1977 | Fed. Rep. of Germany | 106/304 |
| 55-158131 | 12/1980 | Japan | 106/304 |

Primary Examiner—Charles F. Warren
Assistant Examiner—Margaret B. Medley
Attorney, Agent, or Firm—George L. Rushton

[57] ABSTRACT

Lustrous flaky red iron oxide pigments containing aluminum in solid solution are produced by applying hydrothermal treatment to iron oxyhydroxide or colloidal precipitates of a ferric hydroxide in an aqueous aluminate solution. Lustrous pigments exhibiting various colors different from those of titanium dioxide-coated mica pigments are produced by coating titanium dioxide hydrate or titanium dioxide on the surface of the grains of flaky red iron.

12 Claims, 2 Drawing Figures

LUSTROUS PIGMENT AND PROCESS FOR PRODUCING SAME

BACKGROUND

This invention concerns lustrous pigments and processes for producing the same. More specifically, it relates to lustrous pigments which are useful in various fields such as for synthetic resin, cosmetics, ink, synthetic leather, wallpaper and the like, as well as to processes for producing such pigments.

Natural pearl essence, basic lead carbonate, bismuth oxychloride, titanium dioxide-coated mica and the like are examples of lustrous pigments. However, commercial demand is limited for natural pearl essence because of the cost, depending on the yields and of the unstable quality which may vary depending on the clarity of colors. The demand for lead carbonate and bismuth oxychloride is limited because of their toxic nature. Thus, the titanium dioxide-coated mica pigments are used predominantly at present, because they are excellent in view of their non-toxicity and stabilized physical properties.

As a lustrous pigment, however, the titanium dioxide-coated mica still has some disadvantages. For instance, although the grain size is considered to be one of the major factors that influence the quality of titanium dioxide-coated mica pigment, it is difficult to make the grain size uniform for the flaky thin mica pigment obtained by pulverizing and classifying natural mica as the main raw material, and the technique therefor has not yet been established. Also, the method of use and the application field for the pigment are limited at present since the products lack physical strength.

It has been reported that mica-like or plate-like iron oxide (micaceous iron oxide, hereinafter referred to as MIO) is produced by applying hydrothermal treatment (or treatment under pressure in an aqueous environment, such as in an autoclave) to iron oxyhydroxide or a colloidal precipitate of ferric hydroxide in aqueous alkaline solution. The resultant synthesized MIO exhibits rather intense metal luster (Japanese Patent Publication No. 12435/1968). Although MIO is highly regarded as an excellent anti-corrosion paint for iron and steel structures, MIO lacks a decorative effect, due to its blackish-purple color, as contrasted to the clear color desired for the anti-corrosion paints that have been used as coatings on iron and steel structures. Therefore, MIO is not used as over-coating, but, in most cases, as an undercoating, utilizing the anti-corrosive effect. Where MIO paints are used alone, they are applied only to those limited locations such as the underside of the bridges where the colors of the paints are considered insignificant. As one of the methods for giving various colors to the MIO paints, Japanese Patent Publication No. 7176/1976 discloses a method of coating the MIO paints with transparent metal oxides having high refractive index, such as titanium dioxide and zirconium dioxide, which exhibit interference colors such as purple, blue and green. This method cannot, however, provide as clear a color but can produce only those pigments inferior in decorative effect, as compared with titanium dioxide-coated mica pigment.

SUMMARY OF THE INVENTION

In view of the foregoing, we have developed a novel lustrous pigment free from the above defects and less expensive as compared with the titanium dioxide-coated mica pigment. The present invention is based on the findings that flaky red iron oxide containing aluminum in solid solution, exhibiting red color and having intense luster, can be obtained by applying hydrothermal treatment to iron oxyhydroxide ($\alpha$-FeOOH) or a colloidal precipitate of ferric hydroxide, in an aqueous aluminate solution. A further development concerns a pigment having intense luster and exhibiting various colors different from those of the titanium dioxide-coated mica pigment that can be obtained by coating the surface of the grains of flaky red iron oxide containing aluminum in solid solution with titanium dioxide hydrate or with titanium dioxide.

The red flake pigment of red iron oxide, containing aluminum in solid solution and having intense luster, according to this invention has the following characteristic features:

(1) the pigment is non-toxic since it consists of iron-aluminum oxide;
(2) the quality of the product is stabilized since it is a synthetic article, and a product of uniform grain size can be synthesized with excellent reproducibility;
(3) it needs neither pulverizing nor classifying steps since the grain size can be determined by the conditions in the treatment;
(4) since the pigment is thermally stable, no changes occur in its composition, structure and configuration, even during high temperature treatment, and the pigment has a high mechanical strength.

Further, broader application use can be expected for the lustrous pigment of the present invention, prepared by at least partially coating the flaky red iron oxide containing aluminum in solid solution with titanium dioxide, than that for the titanium dioxide-coated mica pigment since the pigment of the present invention has the characteristic features, for example, in that:

(1) it is non-toxic,
(2) the quality of the product is stable since it is based on the synthetic flaky red iron oxide containing aluminum in solid solution of uniform grain size,
(3) the present novel pigment is based on the flaky red iron oxide containing aluminum in solid solution which has intense luster and high refractive index and exhibits red color, and it shows colors different from those of the titanium dioxide-coated mica pigment in the prior art which is based on colorless and transparent mica material with low refractive index, and
(4) it can be produced with lower cost than the titanium dioxide-coated mica pigment.

DETAILED DESCRIPTION OF THE INVENTION

Figure 1:
FIG. 1 is a photograph taken by a scanning type electron microscope showing the structure of flaky red iron oxide containing aluminum in solid solution obtained in Example 2.

We have made various studies on the substrate materials that can present more intense luster than the prior art MIO and exhibit, by the use of metal oxide coatings, clear interference colors comparable with those of the titanium dioxide-coated mica. As a result, the present invention is based on the findings that the MIO luster is remarkably enhanced by forming the solid solution of aluminum into the crystal lattice of MIO, and the colors thereof change from blackish-purple to red, thereby enabling the use as a decorative lustrous pigment. Further, the pigment which exhibits clear colors comparable with those of the titanium dioxide-coated mica and has the previously noted characteristic features can be obtained by coating the substrate material with titanium dioxide hydrate or with titanium dioxide.

Thus, the flaky red iron oxide containing aluminum in solid solution is a novel lustrous pigment useful for decorating purpose and is different from MIO in the following features:

(1) difference in the composition ... while the composition of MIO is represented as; $\alpha-Fe_2O_3$, the flaky red iron oxide containing aluminum in solid solution has the composition of; $\alpha-Fe_{2-x}Al_xO_3$ (where $0 < x \leq 0.3$), (2) difference in color ... while MIO exhibits a blackish-purple color, the flaky red iron oxide containing aluminum in solid solution exhibits a red color, (3) difference in the thickness of crystals ... the thickness of the flaky red iron oxide containing aluminum in solid solution has $\frac{2}{3} - \frac{1}{2}$ of thickness as compared with that of MIO crystals of a same size, (4) difference in the intensity of luster ... the flaky red iron oxide containing aluminum in solid solution has luster more intense than that of MIO. The difference in the luster is particularly remarkable in a case where the pigment is used for paint and plastic applications.

(5) difference in the hiding power ... flaky red iron oxide containing aluminum in solid solution has greater hiding power than that of MIO. Further, in the comparison between the pigment prepared by coating the flaky red iron oxide containing aluminum in solid solution with titanium dioxide and the pigment prepared by coating MIO with titanium dioxide, the former pigment has more intense luster and shows brighter and clearer colors than the latter pigment, since the differences in the properties of the basic materials mentioned above give effects on the pigments applied with the titanium dioxide coating.

The flaky red iron oxide containing aluminum in solid solution according to this invention can be produced by applying a hydrothermal treatment to iron oxyhydroxide or colloidal precipitates of a ferric compound, in an aqueous aluminate solution and, specifically, by dispersing a-iron oxyhydroxide (a—FeOOH), for example, into an aqueous solution of sodium aluminate and then applying a hydrothermal treatment at a temperature above 250° C. in an autoclave. In this case, the a-iron oxyhydroxide is decomposed as $2\alpha-FeOOH \rightarrow \alpha Fe_2O_3 + H_2O$ to crystallize out MIO ($\alpha-Fe_2O_3$). Then aluminum ions in the solution enter into the crystal lattice to form flaky red iron oxide containing aluminum in solid solution ($\alpha-Fe_{2-x}Al_xO_3$).

The aqueous aluminate solution used as the mother liquid for the hydrothermal treatment in the above process can be prepared by dissolving an aluminate salt in water or aqueous alkaline solution, but the aqueous aluminate solution may also be prepared from other aluminum compounds. Specifically, (1) those aluminum compounds such as aluminum chloride, aluminum sulfate and aluminum nitrate, whose aqueous solutions exhibit acidic nature, may be dispersed first in water and then used after adjusting the pH value of the aqueous solution to greater than 10 by the addition of an alkaline agent. Since aluminum is considered to be present as aluminate ions in aqueous solution of pH value greater than 10 ("Qualitative Analytical Chemistry II" written by G. Charlot, translated by Kozo Sekine and Genji Tanaka, published by Kyoritsu Shuppan K. K. in 1974), the aqueous aluminate solution is prepared by the above procedures. (2) In the case of using metallic aluminum, aluminum trioxide and the like, these are dissolved in strong acid or strong alkali. They are applied with the same procedures as shown in (1) above when dissolved into the strong acid, or used as they are when dissolved into the strong alkali. In each case, the solution is adjusted to an appropriate concentration.

The concentration of $Al_2O_3$ in the aqueous aluminate solution is 10–350 g/l and, preferably, 50–300 g/l. It is difficult to obtain the product with intense luster with the concentration below 10 g/l and, on the other hand, it is not practical to use the solution at the concentration above 350 g/l since such a solution lacks storage stability. The above limits apply to other aluminum compounds reacted to form aluminates, when the other aluminum compounds are based on equivalents of $Al_2O_3$.

Alkali metal hydroxides, such as NaOH and KOH, are the typical sources of aqueous alkaline solutions used in the pertinent reactions.

The relative ratio between the $Al_2O_3$ concentration and the alkali hydroxide($OH^-$) concentration in the aqueous aluminate solution is also important in this invention. It is not desirable to use an excessively high alkali concentration relative to the $Al_2O_3$ concentration, since the solid solution ratio of aluminum in the MIO crystal is decreased where the properties of the product come close to those of MIO. On the other hand, if the alkali concentration is too low relative to the $Al_2O_3$ concentration (or the equivalent if $Al_2O_3$ is not the aluminum material used), it is not practical since the storage stability of the solution is worsened. In the case of using sodium aluminate as the aluminate, the concentration ratio of NaOH relative to $Al_2O_3$ (g/l) is, suitably, between about 1.0–1.5 ($NaOH/Al_2O_3$).

The concentration of the slurry in the hydrothermal treatment, where iron oxyhydroxide ($\alpha-FeOOH$, the yellow iron oxide of commerce) is used as the iron starting material, may vary depending on the kind of iron oxyhydroxides and the size of the particles. Thus, although the treatment is possible for the slurry at a concentration as high as 500 g/l, depending on the conditions, the concentration usually lies in a range below 200 g/l in most cases and a range below 100 g/l is particularly preferred in order to obtain product with uniform grain size distribution. A desirable range of slurry is about 5–200 g a-FeOOH per liter of final slurry. A preferred range is 10–100 g/l.

Other factors that influence the grain size and thickness of the product include the heating rate and the conditions of stirring during the hydrothermal treatment. The heating rate is related to the thickness of the flaky particles in the resultant product. Thus, it is necessary to keep the heating rate low and perform sufficient stirring in order to obtain products with large grain size and of reduced thickness. A typical heating rate is from 40°–60° C./hr., from ambient temperature to about 250° C. The heating rate is then reduced to about 10°–15°

C./hr., for the range of 250°–300° C. A typical maximum temperature in the hydrothermal treatment is about 290°–310° C. The time at the maximum temperature is about 15–40 mins., preferably 20–30 mins.

An alternative method of forming flaky red iron oxide containing aluminum concerns forming a colloidal precipitate of $Fe(OH)_3$, by the well-known reaction of a soluble ferric compound and an alkali solution. This colloidal mixture is then mixed with an aqueous aluminate solution and subjected to hydrothermal treatment in an autoclave. The relative reacting weights and ratios are chemically equivalent to those discussed for the reaction of iron hydroxyhydroxide.

The hydrothermal heating rate for the $Fe(OH)_3$—aluminate mixture is about 30°–60° C./hr. from ambient to 150° C. and then about 10°–20° C./hr. from 150° to about 180° C. The treated mixture is maintained at the high temperature for about 6–8 hrs. and then processed as described earlier.

It was confirmed that the flaky products according to this invention are MIO containing aluminum in solid solution in the crystal lattice thereof, by the analysis of X-ray diffraction, chemical analysis, and electronic microscope analysis.

The foregoing analytical methods made it clear that
(1) the flaky products according to this invention, although showing the same X-ray powder diffraction pattern as in MIO, have smaller lattice constant than that of MIO,
(2) about 1–6% of aluminum is contained as $Al_2O_3$ in the products,
(3) the α-line for aluminum is detected from the flaky grains, and
(4) the lattice constant is decreased as the content of the aluminum is increased in the products.

The above findings mean that $Fe^{3+}$ in the MIO crystal lattice is partially replaced with $Al^{3+}$ having a smaller ion radius than that of Fe ions (ion radius: $Fe^{3+}$ 0.67 Å; $Al^{3+}$ 0.55 Å) (refer to "Experimental Chemistry Manual" compiled by Experimentry Chemistry Manual Edition Committee, published by Kyoritsu Shuppan K. K., at 1967).

The above discussion has concerned the formation of flaky red iron oxide containing aluminum in solid solution, as exemplified by $\alpha\text{-}Fe_{2-x}Al_xO_3$ (where $0 < x \leq 0.3$).

Another aspect of the invention concerns at least partially coating the above flaky red iron oxide with titanium dioxide and/or titanium dioxide hydrate. This, broadly, involves dispersing flaky red iron oxide containing aluminum in a solution containing titanium ions. The dispersion is then heated, hydrolyzed, and processed by washing and drying, to give pigment particles having various colors, depending on the % of $TiO_2$ found in the product.

A typical slurry of flaky red iron oxide and titanium solution comprises 35–70 parts by weight of iron oxide per 1000 parts of an aqueous acidic solution of titanium ions. The aqueous acidic solution of titanium ions contains about 3–30 parts of a titanium compound, such as $TiO_2$, and about 10–50 parts $H_2SO_4$, as an example of a mineral acid. The typical and usable form of titanium used in this invention is titanyl sulfate.

The iron oxide-titanyl sulfate slurry is stirred and heated with agitation, to the boiling point of the mixture. The temperature is maintained at the boiling point for about 1–4 hours, preferably about two hours. Then the mixture is diluted by about an equal volume of water, for hydrolysis, and the temperature is maintained for an additional time of about one hour. The mixture is then processed by cooling, washing the filtered product with water until a majority of soluble ions are removed, and drying, to give a lustrous pigment having varying contents of titanium. One variation of the processing is to heat the dried product to about 700° C. for about 15–30 minutes. This calcination removes a substantial portion of the water from the hydrated $TiO_2$.

This invention is described more in detail by examples.

EXAMPLE 1

Commercially available yellow iron oxide (α—FeOOH: Mapico YELLOW-LL-XLO) was dispersed by an amount of 100 g into 200 ml of an aqueous solution of sodium aluminate containing 100 g/l $Al_2O_3$ and 120 g/l NaOH, and the mixture was charged to a nickel-lined autoclave with 500 ml of inside capacity. The contents of the autoclave were heated at a rate of 50° C./hr up to as 250° C. and 15° C./hr from 250° to 300° C. and then maintained at a maximum temperature of 300° C. under the maximum pressure of 78 kg/cm² for 30 min. After being allowed to cool, the contents were removed from the autoclave, washed with water until the electrical conductance of the filtrates decreased below 100 μ℧/cm, dried in an electrical drier for 4 hours at 120° C., and pulverized in a sampling mill, to obtain flaky red iron oxide containing aluminum in solid solution.

The resultant products had a red color (corresponding to JIS standard color chip 7.5R 4.5/8) with intense luster and 4–16 μm of size in the direction of plate-like face. The thickness of the crystals determined by ultramicrotomy was about 0.4 μm.

X-ray powder diffraction for the measurement of the lattice constant gave the results of $a_O = 5.024$ Å and $c_O = 13.72$ Å, and the chemical analysis gave 3.30% $Al_2O_3$.

COMPARISON EXAMPLE 1

Figure 2:
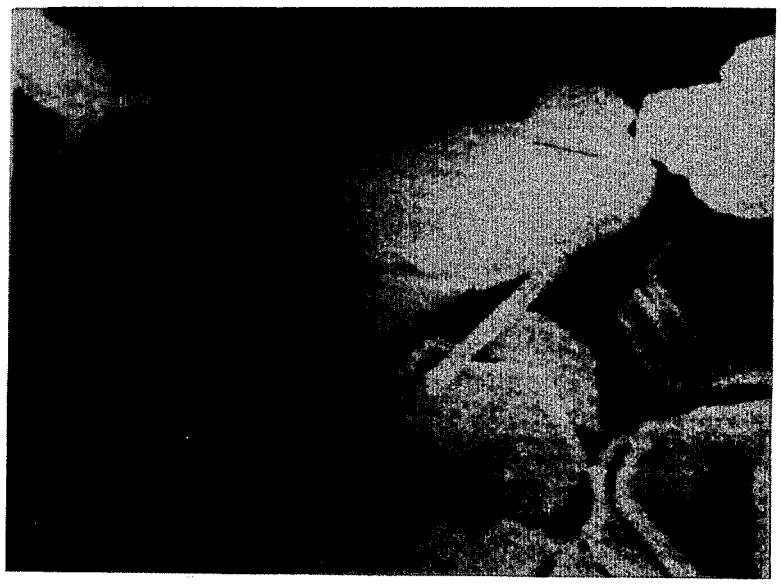
FIG. 2 is a photograph taken by a scanning type electron microscope showing the structure of MIO obtained in Comparison Example 1, in which the magnification ratio is 2,000 in each of the cases.

The same procedures as those in Example 1 were carried out while using 120 g/l of aqueous solution of sodium hydroxide in place of the aqueous solution of sodium aluminate in Example 1, as the mother liquid for the aqueous heat treatment. The resultant products were plate-like grains of black color (corresponding to JIS standard color chip 5R3/1) and having about 5–18 μm of size in the direction of plate-like face and about 1 μm of thickness. X-ray powder diffraction for the measurement of the lattice constant gave the results of $a_O = 5.034$ Å and $c_O = 13.76$ Å. FIG. 2 is a scanning electron microphotograph of some of the crystals.

The results of Example 1 and Comparison Example 1 show that the products obtained by the Example 1 according to this invention were thinner and had smaller measured values for the lattice constants than those of the products (MIO) obtained by Comparison Example 1.

EXAMPLE 2

Yellow iron oxide was prepared by the well-known method of air-oxidizing an aqueous alkaline solution of ferrous sulfate. The resultant yellow α—FeOOH, similar to the commercial α—FeOOH of Example 1, was filtered, washed, and dried in an electrical drier at 100° C. for 5 hours. The yellow iron oxide thus produced was dispersed by adding 50 g of it in 500 ml of an aqueous solution of sodium aluminate containing 150 g/l of $Al_2O_3$ and 180 g/l of NaOH. The dispersion, or slurry, was charged to a nickel-lined autoclave (of 1000 ml inside capacity) equipped with a stirrer. The contents of the autoclave were heated from ambient to 300° C. over a period of 1 hour and 40 minutes while stirred at 350 rpm, and then kept at that temperature for 20 minutes.

After being allowed to cool, the contents were removed from the autoclave, washed with water, dried and pulverized in the same manner as in Example 1 to obtain flaky red iron oxide containing aluminum in solid solution having about 10–35 μm of size in the direction of the plate-like surface and about 0.5 μm of thickness.

The resultant products showed a red color (corresponding to JIS standard color chip 7.5R 5/8) and had luster more intense than that of the products obtained in Example 1. Lattice constant was measured as: $a_O=5.022$ Å and $c_O=13.70$ Å, and chemical analysis gave 4.02% $Al_2O_3$. FIG. 1 is a scanning electron microphotograph of some of the crystals of this Example.

EXAMPLE 3

The same yellow iron oxide as used in Example 2 was dispersed by an amount of 30 g into 500 ml of an aqueous solution of sodium aluminate containing 200 g/l $Al_2O_3$ and 240 g/l NaOH, and the dispersion was charged to a nickel-lined autoclave equipped with stirrer. The contents of the autoclave were heated at a rate of 50° C./hr up to 250° C. and 15° C./hr from 250° to 300° C., with stirring, and then maintained at the maximum temperature of 300° C. under the maximum pressure of 75 kg/cm² for 20 minutes. After being allowed to cool, the contents were removed from the autoclave, washed with water, dried and pulverized in the same manner as in Example 1, to obtain flaky red iron oxide containing aluminum in solid solution having 10–50 μm of size in the direction of the plate-like face and about 0.4 μm of thickness. The resultant products had a red color brighter than that of the product obtained in Example 2, with the red color corresponding to JIS standard color chip 7.5R 5.5/9, and with a more intense luster. The lattice constant was measured as: $a_O=5.019$ Å and $c_O=13.67$ Å; the chemical analysis gave 6.16% $Al_2O_3$.

EXAMPLE 4

To 200 ml of aqueous solution of ferric sulfate containing 375 g/l $Fe_2(SO_4)_3$ was added an aqueous solution containing 736 g/l of sodium hydroxide until the pH value of the solution increased to 10. Then, 645 ml of aqueous solution of sodium aluminate containing 310 g/l $Al_2O_3$ and 330 g/l NAOH were added, and the mixture was charged to a nickel-lined autoclave equipped with a stirrer. The mixture was heated at a rate of 50° C./hr to 150° C. and at a rate of 15° C./hr from 150° to 180° C., with stirring at 500 rpm. The temperature of the mixture was maintained at 180° C. for 8 hours. After being allowed to cool, the contents were taken from the autoclave, washed with water, dried and pulverized to obtain flaky red iron oxide containing aluminum in solid solution, with a particle size range of about 4–15 μm of size in the direction of the plate-like face and about 0.7 μm of thickness. The color of the product, although somewhat darker than that of the product obtained in Examples 1–3 and corresponding to JIS standard color chip 5R ¾, was more reddish with more intensity of luster, as compared with the color of the product in the Comparison Example 1.

The chemical analysis was 5.30% $Al_2O_3$, and lattice constant measurement gave the results of $a_O=5.020$ Å and $c_O=13.69$ Å.

The products of Examples 1–4 and of Comparison Example 1 were formulated into paints using acrylic resin and coated to black and white art paper for comparing the hiding power of them to each other. All of the products in Examples 1–4 showed excellent hiding power compared with the lower hiding power of the product from the Comparison Example 1.

EXAMPLE 5

Flaky red iron oxide containing aluminum in solid solution, synthesized under the same conditions as in Example 2, was dispersed by an amount of 60 g into 1000 ml of aqueous titanyl sulfate solution containing 3.0 g $TiO_2$ and 13.6 g $H_2SO_4$ and then charged to a separable flask having 3000 ml of inside capacity. The mixture was heated with stirring at 300 rpm. After the temperature of the solution arrived at the boiling point, stirring was continued for two hours more while maintaining the temperature of the solution at the boiling point. After two hours at the boiling point, 1000 ml of warm water were added to the mixture, and stirring was continued for one hour while maintaining the temperature at the boiling point. The contents were cooled and washed with water until the electrical conductance of the filtrate was below 100 μ U/cm. The product then was dried in an electrical drier at 120° C. for 4 hours, to obtain a lustrous pigment having a red-brown color corresponding to JIS standard color chip 10R 4.5/8.

The chemical analysis for the product gave 4.40% $TIO_2$.

EXAMPLE 6

Flaky red iron oxide containing aluminum in solid solution, synthesized under the same conditions as in Example 2, was dispersed by an amount of 50 g into 1000 ml of aqueous solution of titanyl sulfate containing 5.0 g $TiO_2$ and 21.2 g of $H_2SO_4$ and then subjected to the same procedures as those in Example 5, to produce a lustrous pigment having a brown color (corresponding to JIS standard color chip 2.5 YR 4.5/6). Chemical analysis for the product gave 7.80% $TIO_2$.

EXAMPLE 7

Flaky red iron oxide containing aluminum in solid solution, synthesized under the same conditions as in Example 2, was dispersed by an amount of 50 g into 1000 ml of an aqueous solution of titanyl sulfate containing 10.0 g $TiO_2$ and 35.0 g $H_2SO_4$ and then subjected to the same procedures as those in Example 5 to produce a lustrous pigment having a blue color (corresponding to JIS standard color chip 10PB3.5/8). Chemical analysis for the resultant product gave 12.7% $TiO_2$.

EXAMPLE 8

Flaky red iron oxide containing aluminum in solid solution, synthesized under the same conditions as in Example 2, was dispersed by an amount of 50 g into 1000 ml of an aqueous solution of titanyl sulfate containing 20.0 g $TiO_2$ and 40.0 g $H_2SO_4$. The mixture was subjected to the same procedures as those in Example 5 to produce a lustrous pigment having a red-purple color (corresponding to JIS standard color chip 2.5RP 3.5/8). Chemical analysis for the resultant product gave 21.1% $TiO_2$.

EXAMPLE 9

Flaky red iron oxide containing aluminum in solid solution, synthesized under the same conditions as in Example 3, was dispersed by an amount of 50 g into 1000 ml of an aqueous solution of titanyl sulfate containing 20.0 g $TiO_2$ and 39.0 g $H_2SO_4$. The mixture was subjected to the same procedures as those in Example 5 and, thereafter, heated at 700° C. for 20 min. to obtain a lustrous pigment with a golden brightness. Chemical analysis for the resulted product gave 20.0% $TiO_2$.

We claim:

1. A lustrous flake pigment having a grain structure of red iron oxide containing aluminum oxide in solid solution.

2. The pigment of claim 1 wherein the surface of grains of flaky red iron oxide containing aluminum oxide in solid solution have at least a partial coating of titanium dioxide and/or titanium dioxide hydrate.

3. A process for producing a lustrous flake pigment having a grain structure of red iron oxide containing aluminum oxide in solid solution, wherein iron oxyhydroxide is dispersed in an aqueous aluminate solution and the resultant mixture is subjected to a hydrothermal treatment at a temperature greater than 250° C.

4. The process of claim 3, wherein
   (a) iron oxyhydroxide ($\alpha$—FeOOH) is dispersed in the aqueous aluminate solution at a ratio of about 25-500 parts by weight iron oxide per 1000 parts aluminate solution,
   (b) the aqueous aluminate solution comprises about 10-350 parts $Al_2O_3$, or the equivalent thereof, and about 10-525 parts alkali metal hydroxide, plus water to complete the 1000 parts, and
   (c) the mixture of iron oxide and aluminate solution is heated to a temperature greater than 250° C.

5. The process of claim 4, wherein the mixture of iron oxide and aluminate solution is heated in stages, such as heating at a rate of about 50°-200° C./hr. from ambient to about 250° C., and then heating at a rate of about 5°-150° C./hr. from about 250° to about 300° C.

6. A process for producing a lustrous flake pigment having a grain structure of red iron oxide containing aluminum oxide in solid solution, wherein a colloidal precipitate of a ferric compound, such as $Fe(OH)_3$, prepared by adding an alkali to an aqueous solution of a ferric salt, is mixed with an aluminate solution, and the mixture is subjected to a hydrothermal treatment at a temperature above 150° C.

7. The process of claim 6, wherein
   (a) from 50 to 100 parts of a soluble ferric salt, such as $Fe_2(SO_4)_3$ or its equivalent, and an aqueous alkaline solution are mixed until the pH is at least 10,
   (b) the aqueous aluminate solution comprises about 175-225 parts $Al_2O_3$, or its equivalent, and 180-235 parts alkali metal hydroxide, per 1000 parts of total solution, and
   (c) the hydrothermal treatment comprises heating the mixture of alkaline ferric material and the aluminate solution from ambient to above 150° C.

8. The process of claim 7, wherein
   (a) the hydrothermal treatment proceeds in stages such as from ambient to about 150° C., at a heating rate of about 30°-70° C./hr and then at a heating rate of about 5°-30° C./hr from about 150° C. to about 180° C., and
   (b) the reaction mixture is maintained at the high temperature for about 8 hours.

9. A process for producing a lustrous pigment wherein the surface of grains of flaky red iron oxide containing aluminum oxide in solid solution is at least partially coated with titanium dioxide hydrate, wherein a water-soluble titanium salt is slurried with flaky red iron oxide containing aluminum oxide, heated, and hydrolyzed.

10. The process of claim 9 wherein the pigment having at least a partial coating of titanium dioxide hydrate is further calcined, resulting in a pigment having at least a partial coating of titanium dioxide.

11. The process of claim 9, wherein
    (a) about 60 parts of flaky red iron oxide containing aluminum oxide are mixed with about 3-20 parts of a water soluble titanium compound and about 10-45 parts mineral acid, with water added to 1000 parts,
    (b) the mixture of iron oxide and acid titanium compound is heated to about boiling, and
    (c) the mixture of iron oxide and acid titanium, after being heated to about boiling, is diluted, about 1:1, with water.

12. The composition $\alpha\text{-}Fe_{2-x}Al_xO_3$, where $0 < x \leq 0.3$.

* * * * *